(12) United States Patent
Ciet et al.

(10) Patent No.: US 8,300,828 B2
(45) Date of Patent: *Oct. 30, 2012

(54) SYSTEM AND METHOD FOR A DERIVATION FUNCTION FOR KEY PER PAGE

(75) Inventors: Mathieu Ciet, Paris (FR); Augustin J. Farrugia, Cupertino, CA (US); Filip Toma Paun, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,832

(22) Filed: Jan. 25, 2012

(65) Prior Publication Data

US 2012/0124366 A1    May 17, 2012

Related U.S. Application Data

(63) Continuation of application No. 12/255,581, filed on Oct. 21, 2008, now Pat. No. 8,121,294.

(51) Int. Cl.
*H04L 29/06* (2006.01)
*H04L 9/00* (2006.01)

(52) U.S. Cl. ......................................... 380/277; 713/162
(58) Field of Classification Search .................. None
See application file for complete search history.

(56) References Cited

U.S. PATENT DOCUMENTS

| | | |
|---|---|---|
| 2005/0002532 A1 | 1/2005 | Zhou et al. |
| 2007/0192592 A1 | 8/2007 | Goettfert et al. |

*Primary Examiner* — Shin-Hon Chen
(74) *Attorney, Agent, or Firm* — Novak Druce + Quigg LLP

(57) ABSTRACT

Disclosed herein are systems, methods and computer-readable media to perform data encryption and decryption using a derivation function to obtain a key per page of data in a white-box environment. The method includes sharing a master key with the sender and receiver, splitting the input data into blocks and sub-blocks, and utilizing a set of keys and a master key to derive a page key. In another aspect of this disclosure, the key validation and shuffling operations are included. This method allows for the derivation of a key instead of storing a predetermined key, thus maintaining system security in a white-box environment.

24 Claims, 11 Drawing Sheets

SYSTEM AND METHOD FOR A DERIVATION FUNCTION FOR KEY PER PAGE

CROSS-REFERENCE TO RELATED APPLICATIONS

This application is a continuation of U.S. patent application Ser. No. 12/255,581, filed on Oct. 21, 2008, entitled "SYSTEM AND METHOD FOR A DERIVATION FUNCTION FOR KEY PER PAGE", which is incorporated by reference in its entirety, for all purposes, herein.

BACKGROUND OF THE INVENTION

1. Field of the Invention

The invention relates to digital rights management, and more specifically to using a derivation function to derive a key for each page of data.

2. Introduction

Protection of digital content transferred between computers over a network is important for many enterprises. Enterprises attempt to secure this protection by implementing some form of digital rights management (DRM) process. The DRM process often involves encrypting the piece of content in order to restrict usage to those who have been granted a right to the content and prevent unauthorized access.

Cryptography is a method to protect digital content by systematically obscuring data so it appears unintelligible to the adversary. The objective of cryptography is to enable users to communicate securely in an insecure environment, while maintaining data integrity, privacy and user authentication. Over time, many cryptography systems have been developed, some requiring a great deal of resources to break. When an adversary recovers the secret key used to protect digital content, the system has been compromised and is no longer secure.

White box cryptography is a cryptographic implementation designed to withstand the white box attack model. In the white box attack model, the adversary has access to the cryptographic software implementation and program execution. In the classical black box model, the attacker has access to only the input and output of the black box. The processes inside the black box are protected from the attacker and considered secure except using side-channel attacks requiring physical manipulation. White box solutions are typically slower and more cumbersome than black box solutions, due to their complexity. However, for some applications, the advantages of using white box solutions outweigh the disadvantages. Software-only white box solutions can be installed and updated remotely, whereas hardware black box solutions cannot without costly approaches. In the white box model, storing the private key in memory is insecure since the adversary has access to the entire system. One approach is to integrate the key into the encryption algorithm so that the key is never made explicit. This approach performs encryption in front of an attacker without ever revealing the secret key.

In the mid 1980s, Ronald Rivest proposed a derivation function called All or Nothing Transform (AONT). The goal was not to derive a key, but to increase complexity with the message length when recovering the key. AONTs can increase the strength of encryption without increasing the key size. FIG. 2 illustrates the prior art AONT algorithm in terms of a system implementing AONT, such as a computing device. The system initializes a value b to zero (202) and fetches a plain text block (204). The system encrypts each plaintext block (206) with a random key (208) to form a pseudomessage and, using a shared master key (210), hashes each block (212). The system applies an exclusive-or (XOR) (214) operation of all the hashes together with the value b to generate an output cipher block (216). The system determines whether the block is the last block (218) and, if yes, the system XOR's the value b (220) with the random key (208) to generate the last block of the pseudomessage (222).

FIG. 3 illustrates a more detailed view of the prior art AONT encryption process, also discussed in terms of a system implementing the AONT algorithm. Here, the system initializes a $b_{n+1}$ value to zero (302) and splits a message m into sub blocks (304). A variable i is initialized to zero (306) and the system chooses a random value k' (308). The system starts a loop until i is equal to n+1 (310). If i is not equal to n+1, the system executes the following steps. The system assigns E(i,k`) to $a_i$ (312). The function represents any encryption algorithm. The system assigns $a_i$ XOR $m_i$ to $b_i$ (314). (The symbol $\oplus$ means XOR.) The system assigns $b_i$ XOR i to $g_i$ (316) to prevent duplicate blocks from encrypting identically. The system next assigns $l_i$ to $E(g_i, k)$ where E is any encryption function (318). The system assigns $b_{n+1}$ XOR $l_i$ to $b_{n+1}$ (320). The system increments i as i+1 (322) and returns to step 310. After each loop is processed, and the result of i=n is "Yes" in step 310, the system assigns $b_{n+1}$ to $b_{n+1}$ XOR k' (324), and outputs the set of encrypted blocks $\{E (b_i, k)\}_{0 \ldots n+1}$. (3264). The system applies an XOR of each block with an incrementing counter. Using the counter preserves block order for encryption modes such as Electronic Code Book (ECB). The package created cannot be partially decoded, and can use a cipher in any mode, for example ECB or Cipher Block Chaining (CBC). AONTs are hard to invert unless all of the output is known.

The use of an AONT results in a ciphertext that is one word longer than the plaintext (326). Three encryptions are applied to each block of data, two static and one dynamic. Dynamic encryption refers to using a random key, while static encryption refers to using a non-random key. In this approach, partial messages cannot be decrypted; the entire package must be decrypted at the same time.

FIG. 4 illustrates a prior art AONT decryption process. The system decrypts each block of ciphertext with the master key (402) to obtain a set $\{b_i\}_{0 \ldots n+1}$. The system initializes i to 0 (404) and starts a loop until i is equal to n+1 (406). For each block, the system computes a value g by applying an exclusive or of the corresponding value b with the index (408) and computes a value l as the encryption of the corresponding g and the master key (410). The system increments i by 1 (412) and tests the loop condition again (406). Once all of the g's and l's have been produced, the system initializes both i and k' (the random key) to 0 (414), and starts a loop until i equals n+1 (416). The system computes a partial random key (418) by XORing the random key with the corresponding l (418). The system then increments i by 1 (420) and tests the loop condition again. The completed random key is computed by applying an exclusive or of the partial random key with $b_{n+1}$ (422). The system initializes i to 0 again (424) and starts another loop until i is equal to n+1 (426). For each block, the value a is generated by encrypting the block index with the random key (428), and the decrypted block is produced by applying the exclusive or of the value a with the corresponding b (430). The system outputs the decrypted block (432). The system increments i by 1 (434) and tests the loop condition again in step 426. Once all of the blocks have been decrypted and output, the process is complete.

Since AONT was developed in the 1980s, it was not considered in the white box environment. Accordingly, what is needed in the art is a more secure method to make key extraction difficult in a white box environment.

SUMMARY

Additional features and advantages of the invention will be set forth in the description that follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods and computer-readable media to perform data encryption and decryption using a derivation function to obtain a key per page of data in a white-box environment. The method includes sharing a master key with the sender and receiver, splitting the input data into blocks and sub-blocks, utilizing a set of keys, a master key, the data blocks and an encryption algorithm to derive a page key. In another aspect of this disclosure, the key validation and shuffling operations are included. This method allows for the derivation of a key instead of storing a predetermined key, thus maintaining system security in a white-box environment.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
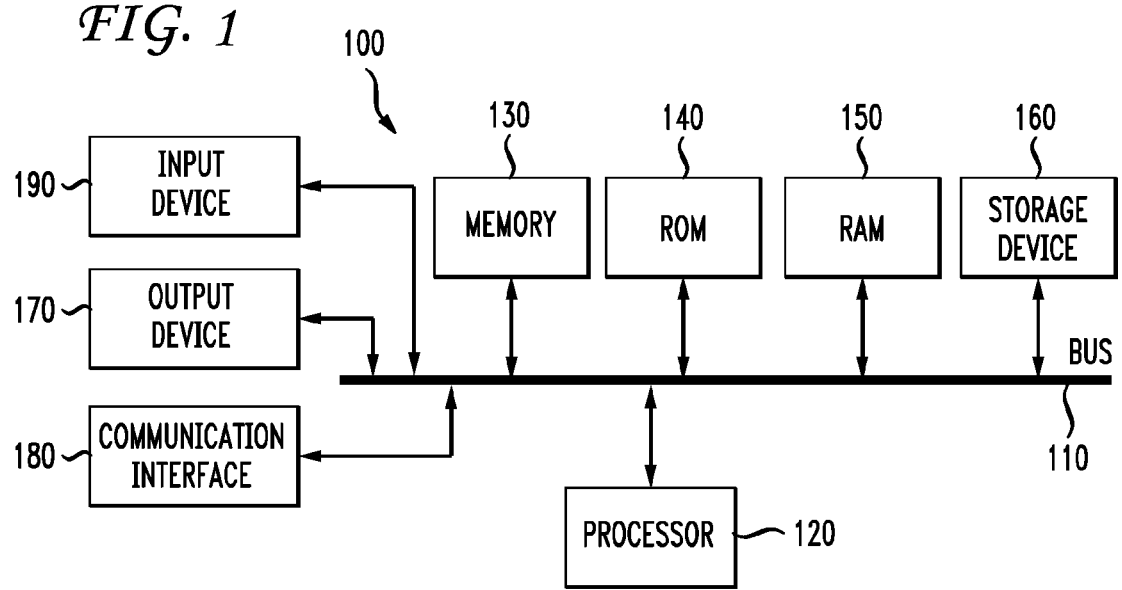
FIG. 1 illustrates an example system embodiment.
Figure 2:
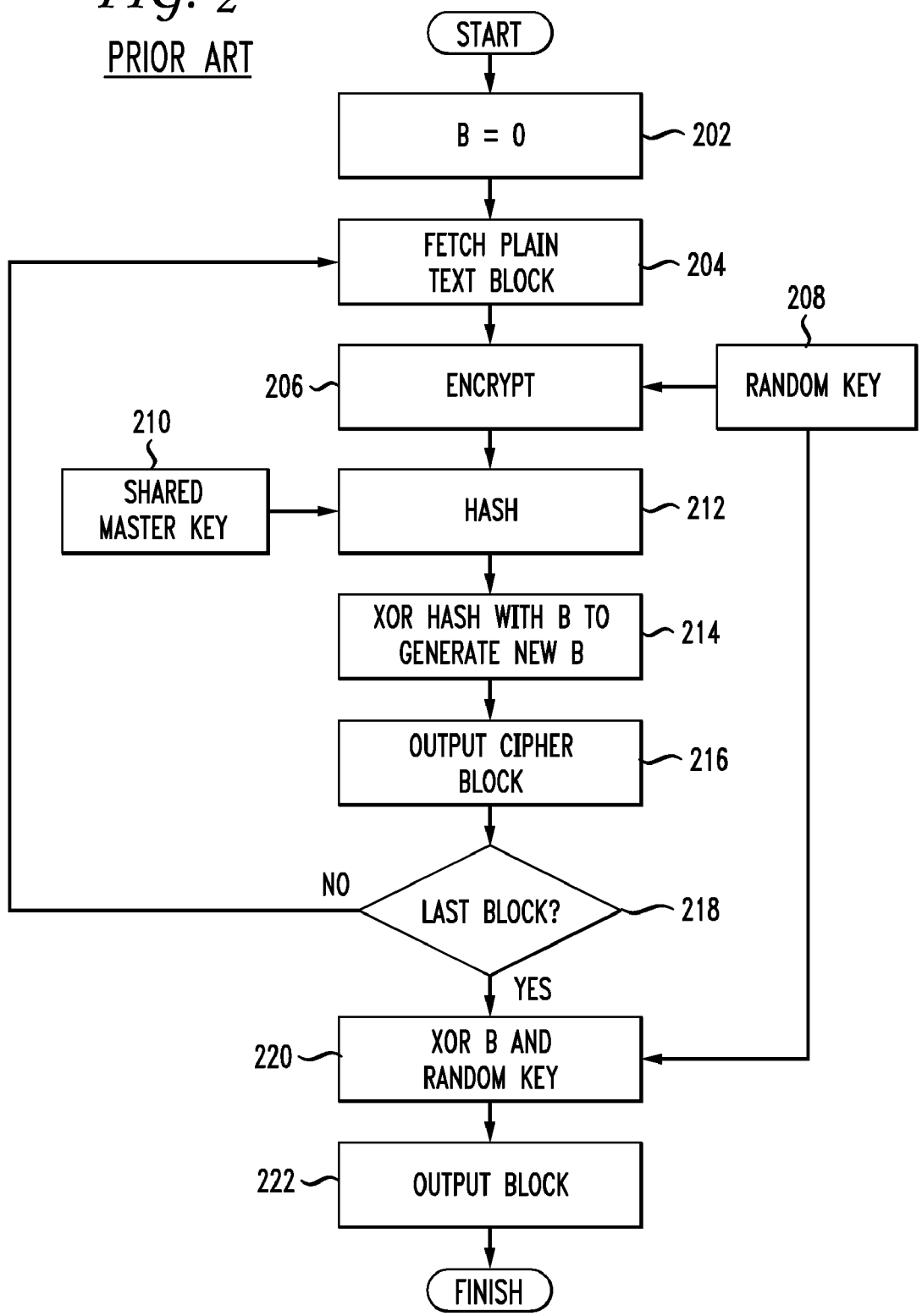
FIG. 2 illustrates a prior art AONT encryption process.
Figure 3:
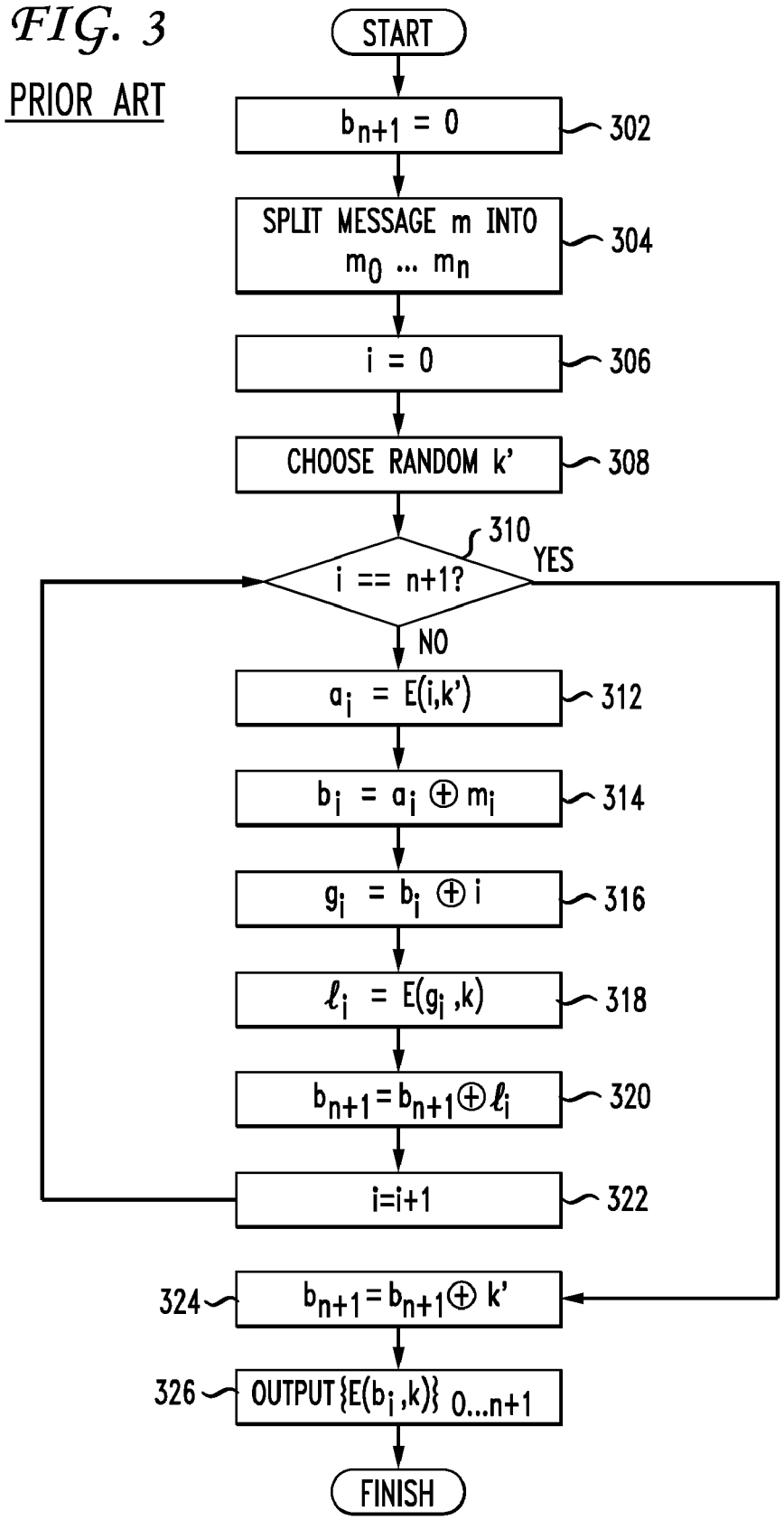
FIG. 3 illustrates a prior art AONT encryption process.
Figure 4:
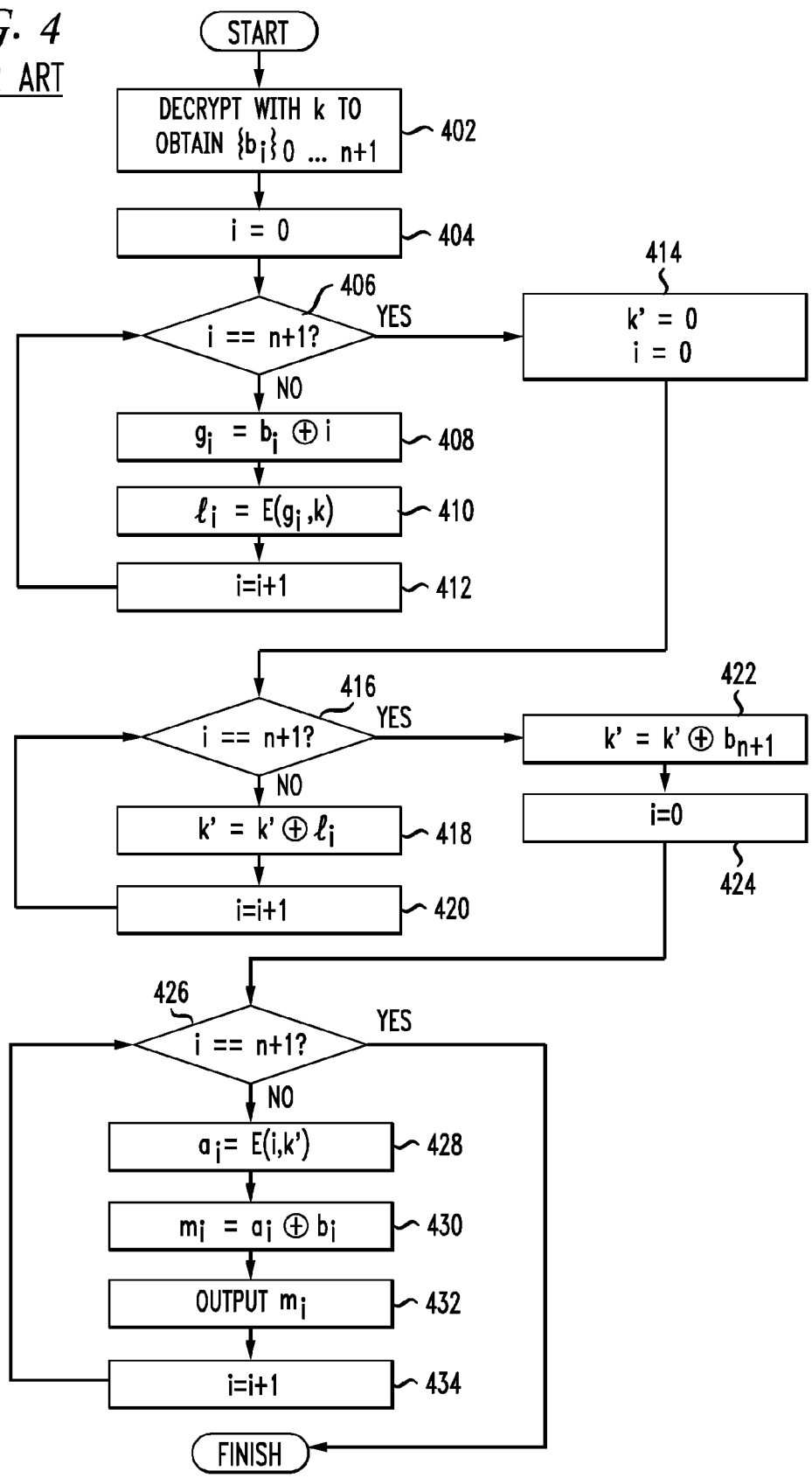
FIG. 4 illustrates a prior art AONT decryption process.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 5:
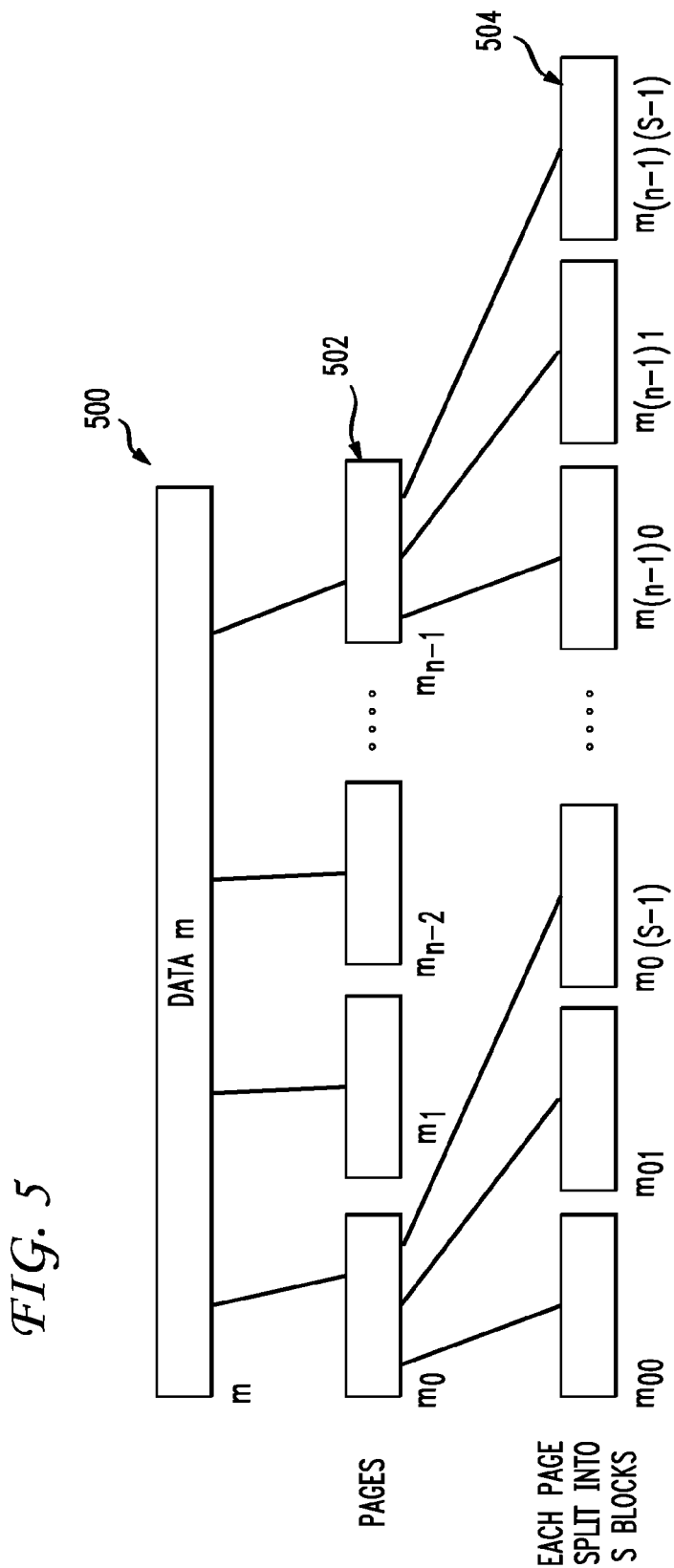
FIG. 5 illustrates a data splitting operation.

Having disclosed the basic system components that can be used in conjunction with the principles described herein, the disclosure turns to a method of encrypting a message using derived keys in a white box environment based on the AONT scheme. The main goal is to make key extraction more difficult when an attacker has complete visibility into a system. Instead of using the classical method of storing the cryptographic key in a system, both a random key and a master key shared between the sender and receiver are utilized to derive a key to encrypt and decrypt digital content. FIG. 5 illustrates a data splitting operation. The AONT decryption process consists of splitting the ciphertext m (500) or data into blocks $m_0$ to $m_{(n-1)}$ (502) or frames. Each frame or block is split into S sub-blocks $m_{00}$, $m_{01}$, $m_{02}$, . . . , to $m_{(n-1)(S-1)}$ (504). An encryption system can use a master key k and a set of keys $\{k_i\}$ to encrypt each frame in Cipher Block Chaining (CBC) mode, $\{m_{ij}\}_j$.

Figure 6:
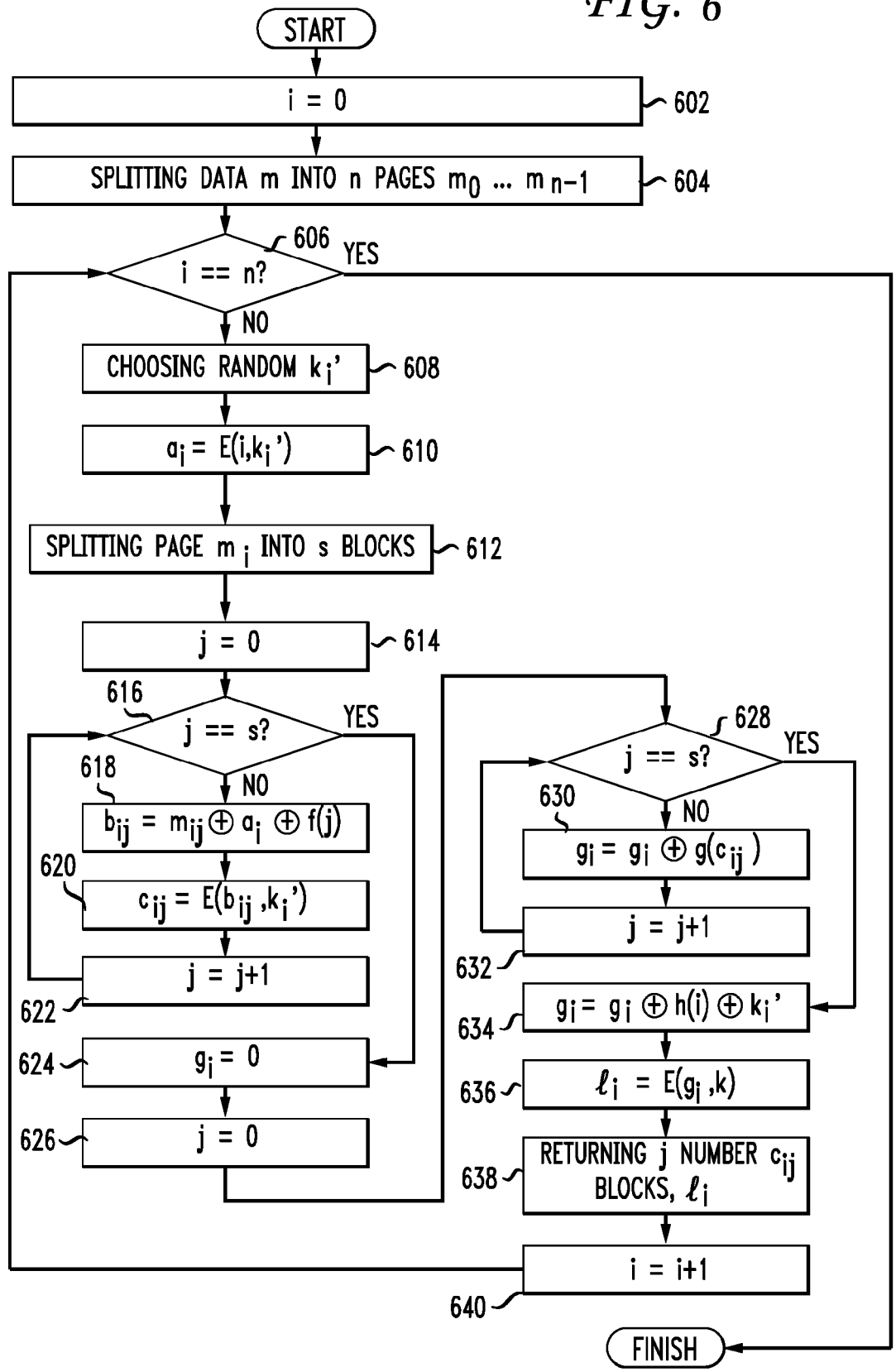
FIG. 6 illustrates a key per block encryption process.

FIG. 6 illustrates a key per block encryption process. A system designed to practice the method of encryption of data m performs the following steps. The system initializes i to 0 (602) and splits the data m into n pages (604). For each page $m_0 \ldots m_{n-1}$, this system performs the following steps: choosing a random key $k_i'$ (608); computing a, (610); splitting page $m_i$ into s blocks (612); for each block element j (initialized to zero in step 614) inside the page (616), computing $b_{ij}$ and $c_{ij}$ (618), (620); incrementing j by 1 (622) and reevaluating the conditional loop (616), initializing variables $g_i$ and j (624), (626) to start another loop (628) while j is less than s; computing $g_i$ (630), (634); incrementing j by 1 (632) and reevaluating the conditional loop (628); computing $l_i$ (636) and returning the set of encrypted blocks $\{c_{ij}\}_j$ and $l_i$ (638). The value s in step 616 depends on i and therefore may be a variable. Further, s may be variable on a block by block basis and may not be the same for all blocks. The system computes the value $a_i$ by encrypting index i with the random key $k_i'$ (610). The value $b_{ij}$ is the XOR of $m_{ij}$ with $a_i$ and f(j) (618), where the function f is defined and can be any function. The value $c_{ij}$ is the encryption of $b_{ij}$ and random key $k_i'$ (620). The value $g_i$ is the XOR of the result of $g(c_{ij})$ for all the blocks $c_{ij}$ for page i in step 630, and h(i) and $k_i'$ in step 634. The result of the encryption of $g_i$ and the master key k is $l_i$ (636). The functions f, g and h are predetermined and may create links between pages, blocks, etc. At the end of each page encryption round the system returns, the set of cipher blocks $\{c_{ij}\}_j$ and $l_i$ in step 638.

Figure 7:
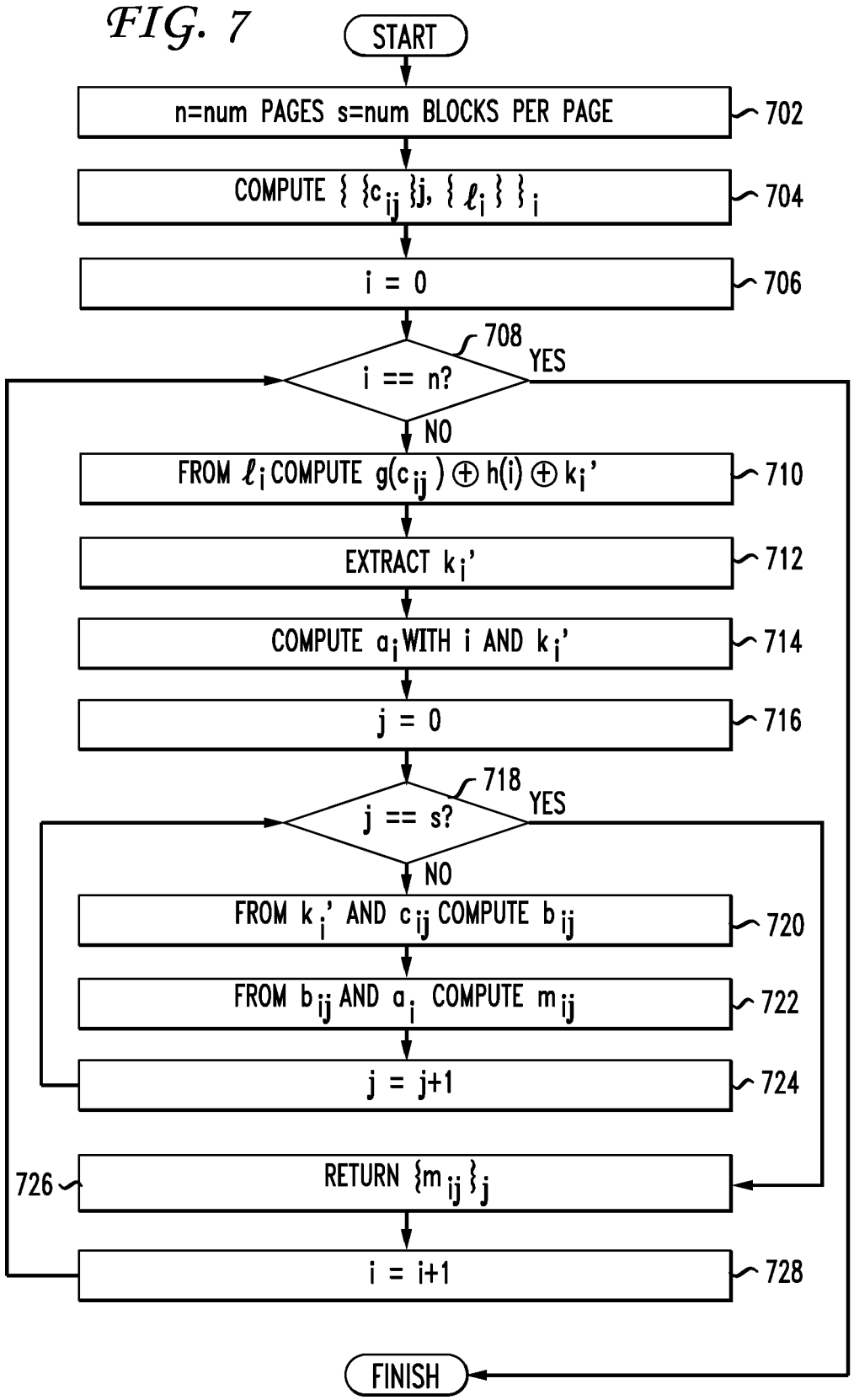
FIG. 7 illustrates a key per block decryption process.

FIG. 7 illustrates a key per block decryption process. FIG. 7 is essentially the reverse operation of FIG. 6. A system implementing the key per block decryption process first sets n to the number of pages and sets s to the number of blocks per page (702). The system then computes $\{\{c_{ij}\}j,\{l_i\}\}_i$ (704) and initializes i to 0 (706) for use in a loop (708) until i is equal to n. Given input of cipher blocks $\{c_{ij}\}_j$ and $l_i$ for each page i, the system computes $g(c_{ij})$ XOR h(i) XOR $k_i'$ (710) from $l_i$. Then the system extracts $k_i'$ (712), which is possible since all the $c_{ij}$ are known. The system computes $a_i$ with i and $k_i'$ (714). For each block j inside page i (718), the system computes $b_{ij}$ from $k_i'$ and $c_{ij}$ (720) to obtain the plaintext block $m_{ij}$ from $b_{ij}$ and $a_i$ (722). The system increments j by 1 (724) and reevaluates the conditional loop (718). Then the system returns the set of plaintext blocks $m_{ij}$ (726) for each page i (728) in the loop.

With the aforementioned encryption and decryption algorithms, the static implementation using the static master key k is only used one time per page as opposed to using it two times per page in standard AONT. The number of dynamic encryptions for each page (using the dynamic random key $k_i'$) equals the number of blocks in the page plus one. Increasing the number of dynamic encryptions and decreasing the number of static encryptions improves the security of the algorithm since the dynamic encryption utilizes the random key. Note that the number of calls to the dynamic implementation cannot be reduced unless partial encryption of the data is allowed. Moreover, if an independent key per page is needed, the minimum number of calls to the static encryption is used.

Encrypted data m is enlarged compared to the original data. The number of extra blocks corresponds to the number of pages. During each page encryption round, $l_i$ is output in addition to the ciphertext. The size of $l_i$ depends on the encryption algorithm E used. Any encryption algorithm will do. For instance, if the encryption algorithm E takes 16 bytes as input, and there are 200 pages to encrypt, there are 200 calls to the static implementation (where $l_i$ is computed) and 200*16 extra bytes. An advantage of the disclosed embodiments is the number of dynamic white boxes used compared static white boxes.

Figure 8:
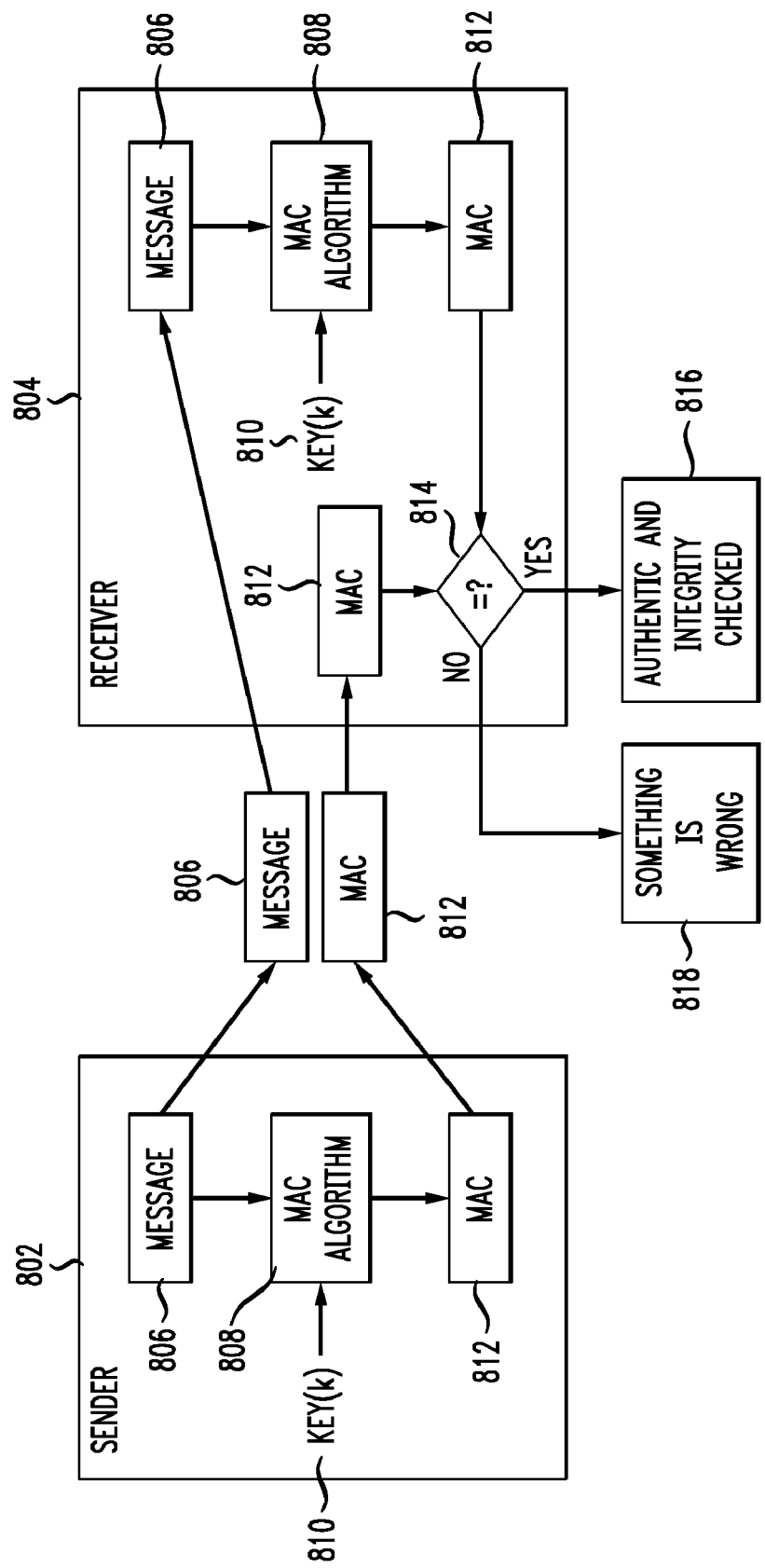
FIG. 8 illustrates an HMAC process.

FIG. 8 illustrates an HMAC process between a sender 802 and a receiver 804. An HMAC, or keyed-hash message authentication code, is a message authentication code that uses a cryptographic hash function in combination with a secret key 810 to transmit a message 806. The HMAC is used to verify data integrity. The HMAC takes data or a message 806 as input and produces a code 812, which is then sent with the original data to the receiver 804. The receiver then performs the same calculation on the original message 806, producing its own code 812. The code sent with the original data is compared with the code generated by the receiver. If the codes match 814, the data is accepted as authentic. If the codes do not match 818 the system knows something is wrong and the data may be discarded. In one variation, mismatches are logged and the system analyzes logs to discover possible attack vectors and/or possible error sources.

Figure 9:
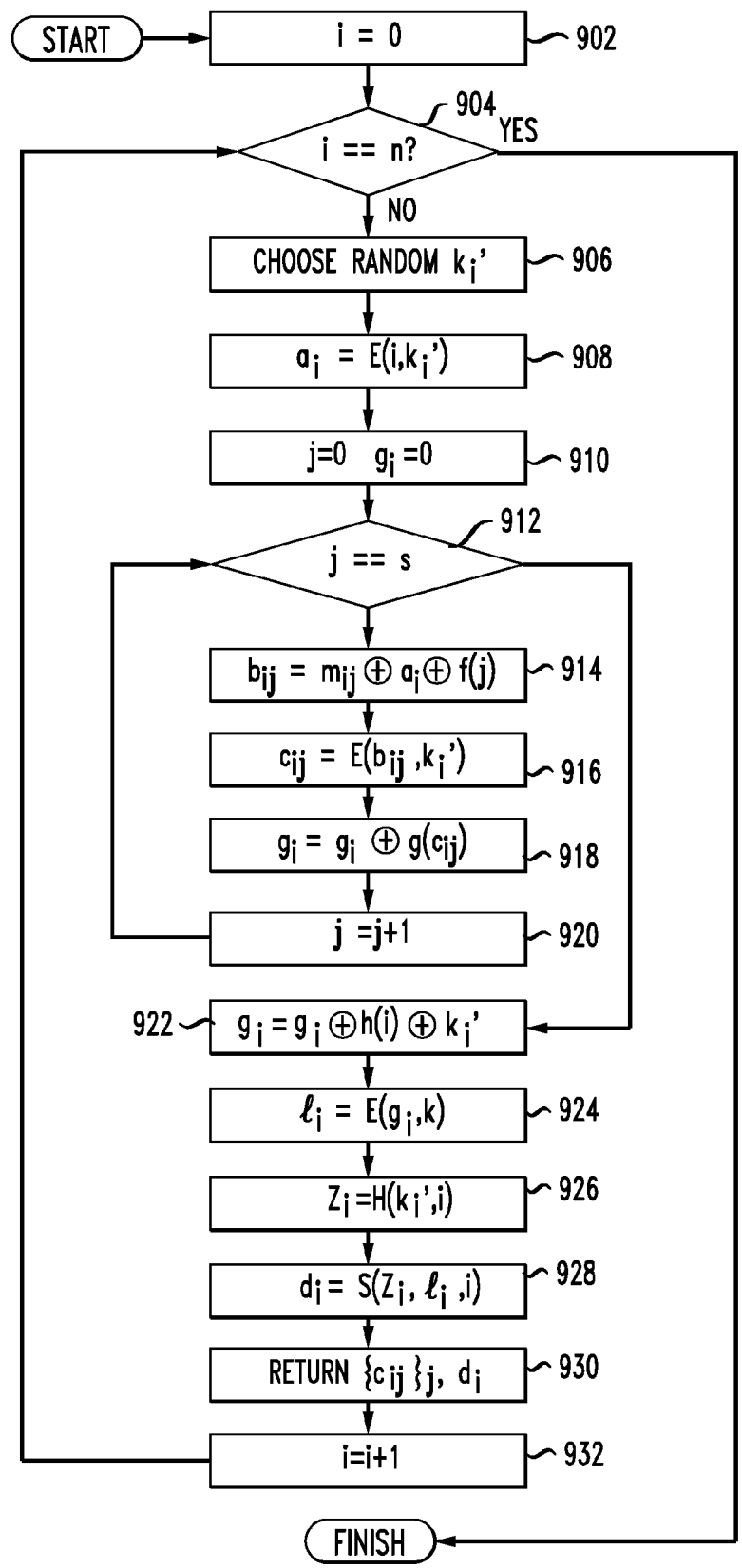
FIG. 9 illustrates an improved key per block encryption process.

FIG. 9 illustrates an improved key per block encryption process. Without validating the key during the decryption process it is impossible to know if the recovered key is correct. One solution is to add a block of an HMAC of the random key $k_i'$ for each page. The disadvantage of this approach is that data size is increased too much. To solve this problem, a "homemade" HMAC can be used. One of the main advantages of using such a homemade HMAC is that data lengths can be not standard or variable. This approach can be useful to deter reverse engineering efforts. Reverse engineering is the process of discovering the technical details of a device, system or process by analyzing its structure and functions. The process usually involves taking something apart and analyzing it in detail. Using a non-standard length in the homemade HMAC increases the difficulty for an attacker to break. The system can include a shuffling operation in addition to the homemade HMAC. Adding the homemade HMAC is useless from a security point of view, but may be useful from a practical point of view.

FIG. 9 assumes input data m that is split into pages, blocks, and sub-blocks as detailed in FIG. 5. The system uses a master key k and a set of keys $\{k_i\}$ to encrypt each page in Cipher Block Chaining (CBC) mode, $\{m_{ij}\}_j$. For each page $m_0 \ldots m_{n-1}$, the system chooses a random key $k_i'$ (906) and computes $a_i$ as $E(j, k_i')$ (908). The equation E represents any encryption algorithm. For each block element j inside the page (910), (912), the system computes $b_{ij}$ and $c_{ij}$ (914), (916) and computes $g_i$ (918), (922). The system increments j by 1 (920) and reevaluates the conditional loop (912). The system then computes $l_i$ (924), computes $z_i$ (926), computes $d_i$ (928), and returns the set of encrypted blocks $\{c_{ij}\}_j$ and $d_i$ (930). The system increments i by 1 (932) and reevaluates the conditional loop (904). The system computes $a_i$ by encrypting the page index i with the random key $k_i'$ (908). The value $b_{ij}$ is the XOR of the unencrypted block $m_{ij}$ with $a_i$ and $f(j)$, where the function f is predetermined (914). The value $c_{ij}$ is the encryption of $b_{ij}$ and the random key $k_i'$ (916). The value $g_i$ is the XOR of the result of $g(c_{ij})$ for all the blocks $c_{ij}$ for page i (918), h(i) and the random key $k_i'$ (922), wherein the function h is predetermined. The value $l_i$ in step 924 is the result of the encryption of $g_i$ and the master key k. The value $z_i$ is the result of applying a hashing function to the random key $k_i'$ and the page index i (926), wherein the hashing function is an internal HMAC function that outputs a non-standard number of bits. At the end of each page round, the system returns the set of cipher blocks $\{c_{ij}\}_j$ and $d_i$ (930). The value $d_i$ is the result of performing a shuffling operation S on $z_i$, $l_i$ and page index i (928). The function S is a permutation function that reorders the element given as input according to the page number i. The functions f, g and h are defined and create links between pages, blocks, etc.

Figure 10:
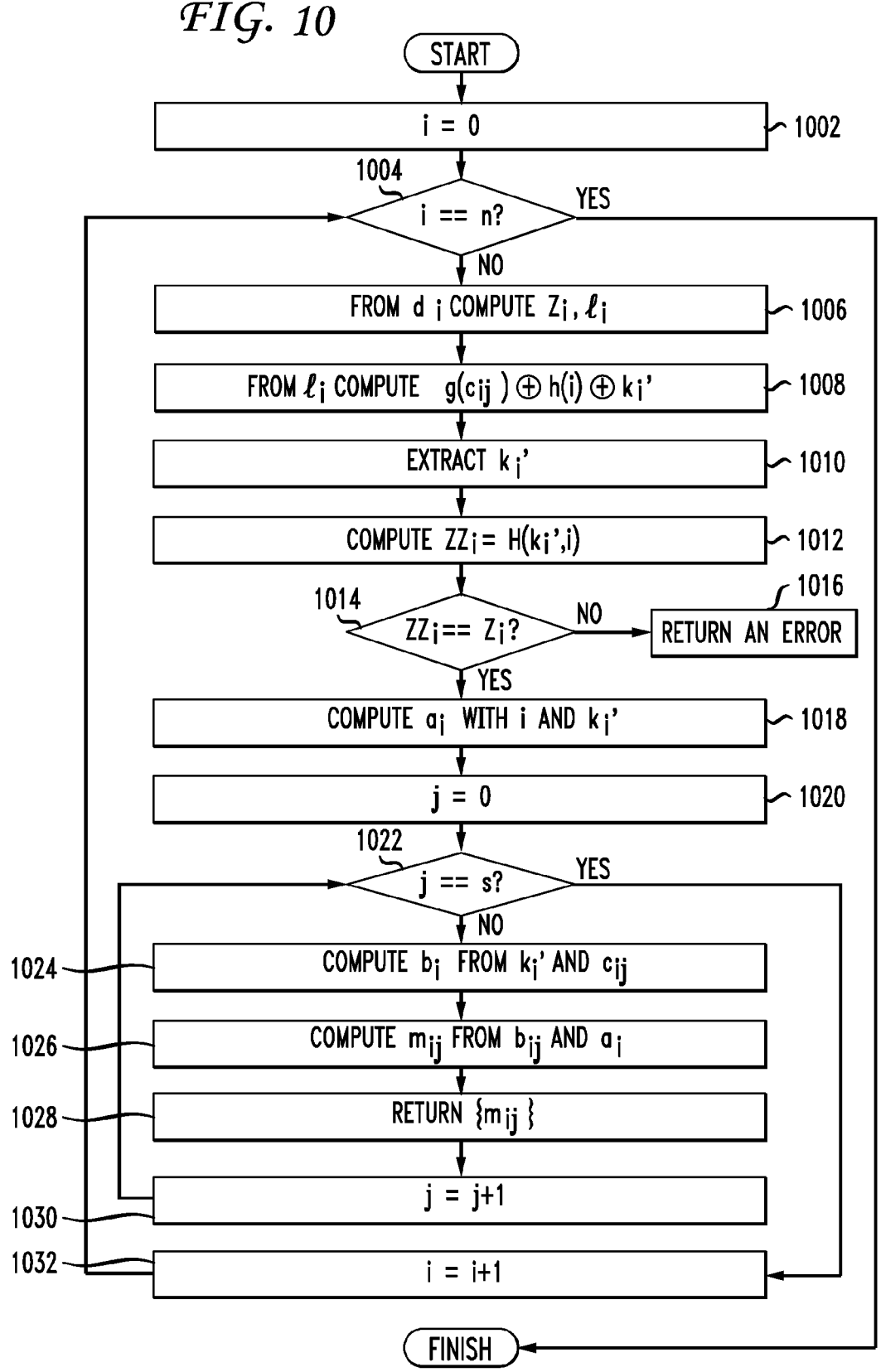
FIG. 10 illustrates an improved key per block decryption process.

FIG. 10 illustrates an improved key per block decryption process. The process will be described in terms of a system that performs the process. The input for FIG. 10 is $\{\{c_{ij}\}, d_i\}_i$ and the output is $m=\{m_{ij}\}_{ij}$ or an error. The system initializes variable i to 0 (1002). Next the system initiates a loop that repeats while i is not equal to n (1004).

The following actions are included in the loop 1004. The system computes $Z_i$ and $l_i$ from $d_i$ (1006). The system computes $g(c_{ij}) \oplus h(i) \oplus k_i`$ from $l_i$ (1008). The symbol $\oplus$ means XOR. The system extracts the random key $k_i`$ from the variable delta (1010), which is possible since all the cipher blocks are known. The system hashes the random key and the counter (1012) and compares the hash with a variable (1014). If the generated value and the variable are unequal, the system returns an error (1016). The system computes $a_i$ with i and $k_i`$ (1018).

Before the next nested loop, the system initializes j to 0 (1020). The system then initiates a loop until j is equal to s (1022). If j is not equal to s, the following steps are performed. The system computes $b_{ij}$ from $k_i`$ and $c_{ij}$ (1024). The system incorporates the random key in additional computations and decrypts the cipher (1026). The result is a set of plaintext blocks, or $\{m_{ij}\}$ (1028). Then, the system increments j (1030) and program flow returns to the conditional governing the nested loop (1022). If j is equal to s, then i is incremented (1032) and program flow returns to the conditional governing the outer loop 1004. Otherwise, the nested loop is executed again.

One preferred decryption solution is simply the inverse of the encryption process in FIG. 10. The inverse may be preferred because it performs key validation. Without establishing key validity during decryption, the system has no way to know if the recovered key is correct. Adding a few steps, specifically a homemade HMAC and a shuffling operation, solves this problem. During decryption, the system returns an error when it discovers inconsistencies. From a security analysis point of view, adding a weak HMAC is useless, but in practice it is useful.

In one preferred method, the system uses a static implementation utilizing the shared key once per page, whereas the number of dynamic encryptions utilizing the random key for each page is the number of blocks plus one, since an additional dynamic encryption occurs outside of the loop processing the blocks. This differs from the original AONT algorithm, where the system performs two static and one dynamic encryption for each page. In fact, more dynamic encryptions can improve efficiency and security when compared to the original AONT scheme. Additionally, the system output is larger after encryption than the input. The extra bytes are the result of multiplying the number of pages with the input size of the encryption algorithm. Although this process increases data size, the additional security gained by using it outweighs the cost in most cases.

Figure 11:
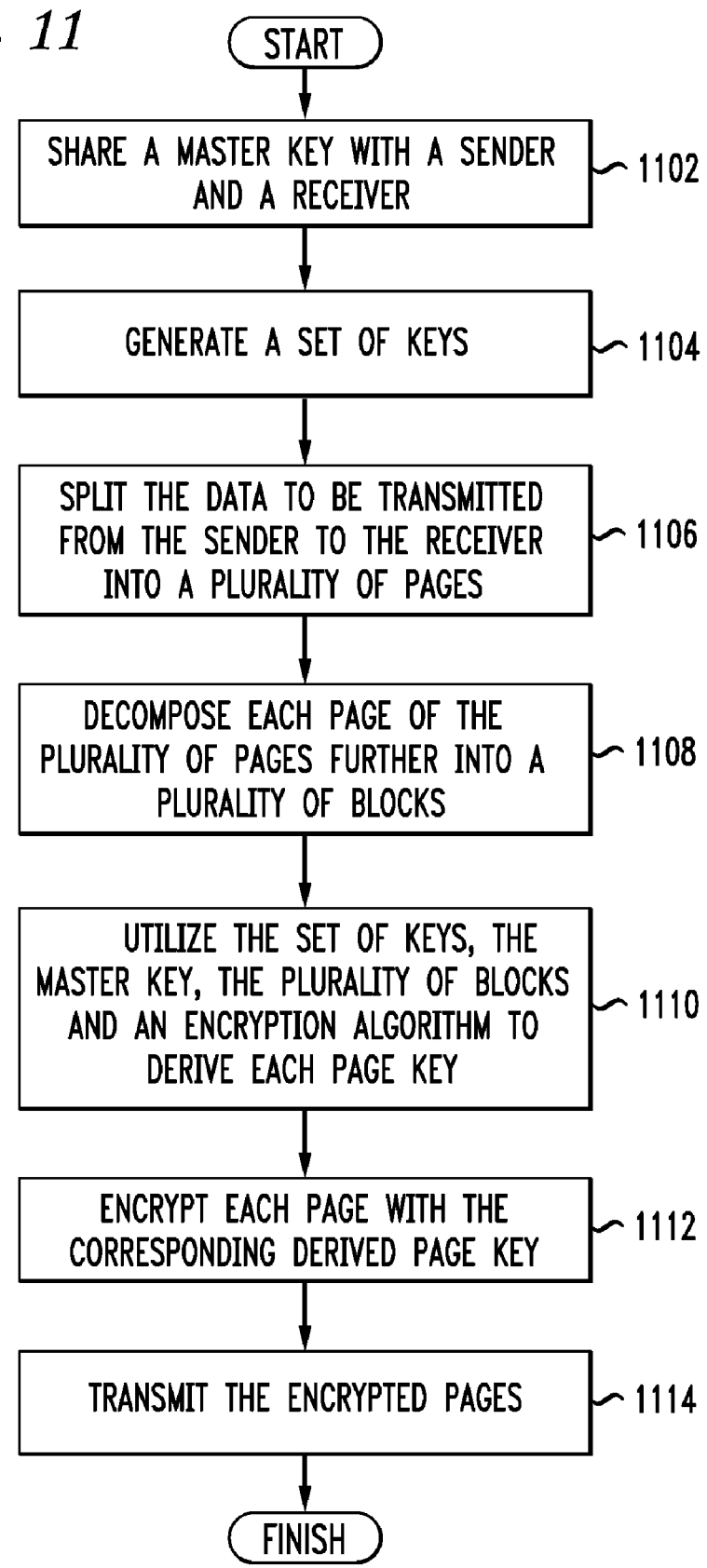
FIG. 11 illustrates an example method embodiment.

FIG. 11 illustrates an example method embodiment. The method is discussed in terms of a system designed to perform the method. Such a device may be, for example, a desktop computer, a server, a portable device, or any combination thereof. In some embodiments, portions of the method are performed on one device and other portions are performed on other device(s). The system shares a master key with a sender and a receiver (1102). The system generates a set of keys (1104). This may be done randomly or through a calculated approach. The system then splits the data to be transmitted from the sender to the receiver into a plurality of pages (1106).

The system decomposes each page of the plurality of pages into a plurality of blocks (1108). The system utilizes the set of keys, the master key, the plurality of blocks and an encryption algorithm to derive a key to encrypt each block or each page (1110), encrypts each page with the corresponding derived key (1112) and transmits the encrypted pages (1114). One example of how the system can utilize the set of keys, the master key, the plurality of blocks and an encryption algorithm to derive the page key for each page i is as follows: choosing a random variable $k_i'$; computing $a_i = E_1(i, k_i')$, where $E_1$ is any encryption algorithm and i, is an index; for each block element j inside the page i computing $b_{ij} = m_{ij}$ XOR $a_i$ XOR $f(j)$, wherein $m_{ij}$ is a block of unencrypted data and f is a predetermined function, computing $c_{ij} = E_2(b_{ij}, k_i')$, wherein $E_2$ is any encryption algorithm; computing $g_i = (\text{XOR}_i \, g(c_{ij}))$ XOR h(i) XOR $k_i'$, wherein g and h are predetermined functions; computing $l_i = E_3(g_i, k)$, wherein $E_3$ is any encryption algorithm and k is the master key; and returning $\{\{c_{ij}\}_j, l_i\}_i$ wherein $c_{ij}$ is an encrypted block. In one variation, the encryption algorithms E1, E2, and E3 are equal. These algorithms may also be different. In another variation, $(\text{XOR}_i \, g(c_{ij}))$ is the XOR of all the blocks c for the page i subject to a function g.

The method of splitting data differs from the traditional method of splitting input into blocks with size corresponding to the block cipher used. The encryption solution of FIG. 11 produces a set of cipher blocks and an extra block of data. The decryption solution produces a set of unencrypted blocks. The principles disclosed herein provide for key derivation rather than simply storing a set key and thus maintain system security in a white-box environment.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Although the above description may contain specific details, they should not be construed as limiting the claims in any way. Other configurations of the described embodiments of the invention are part of the scope of this invention. For example, different block cipher algorithms can be used within the derived key per block algorithms or with different HMAC algorithms. Accordingly, the appended claims and their legal equivalents should only define the invention, rather than any specific examples given.

We claim:

1. A method comprising:
splitting message data into a plurality of pages, wherein each page of the plurality of pages further comprises a respective plurality of blocks;
deriving a page key, via a processor of a computing device, based on a set of keys, the plurality of blocks, an encryption algorithm, and a master key known to a receiving device; encrypting a page from the plurality of pages with the page key to yield an encrypted page; and transmitting the encrypted page to the receiving device.

2. The method of claim 1, further comprising randomly generating the set of keys.

3. The method of claim 1, wherein deriving the page key further comprises:
for each page i:
a) choosing a random variable $k_i{}'$;
b) computing $a_i = E_1(i, k_i{}')$, where $E_1$ is any encryption algorithm and i is an index;
c) for each block element j inside the page i:
1) computing $b_{ij} = m_{ij}$ XOR $a_i$ XOR f(j), wherein $m_{ij}$ is a block of unencrypted data and f is a predetermined function;
2) computing $c_{ij} = E_2(b_{ij}, k_i{}')$, wherein $E_2$ is any encryption algorithm;
d) computing $g_i = (XOR_i\ g(c_{ij}))$ XOR h(i) XOR $k_i{}'$, wherein g and h are predetermined functions and (XOR, $g(c_{ij})$) is the XOR of all the blocks c for the page i subject to the function g;
e) computing $l_i = E_3(g_i, k)$, wherein $E_3$ is any encryption algorithm and k is the master key; and
f) returning $\{\{c_{ij}\}_j, l_i\}_i$ wherein $c_{ij}$ is an encrypted block.

4. The method of claim 3, wherein $E_1$, $E_2$, and $E_3$ are a same algorithm.

5. The method of claim 3, wherein at least one of $E_1$, $E_2$, and $E_3$ is an HMAC function.

6. A non-transitory computer-readable storage medium having stored therein instructions which, when executed by a computing device, cause the computing device to perform steps comprising:
identifying a master key associated with a sending device;
splitting encrypted data received from the sending device into a plurality of pages, wherein each page of the plurality of pages further comprises a respective plurality of blocks; and
decrypting the page using a page key generated based on a set of keys, the master key, the plurality of blocks and a decryption algorithm.

7. The non-transitory computer-readable storage medium of claim 6, further having stored therein instructions which, when executed by the computing device, cause the computing device to perform steps further comprising:
for each page i of the plurality of pages:
a) computing $g(c_{ij})$ XOR h(i) XOR $k_i{}'$ from a variable $l_i$, wherein g and h are predetermined functions, $c_{ij}$ is an encrypted block of data and $k_i{}'$ is the random key;
b) extracting $k_i{}'$ from the result of step a);
c) computing $a_i$ based on i and $k_i{}'$;
d) for each block element j inside page i:
1) computing $b_{ij}$ from $k_i$ and $c_{ij}$;
2) computing $m_{ij}$ from $b_{ij}$ and $a_i$; and
e) returning $\{\{m_{ij}\}_j\}_i$, wherein $m_{ij}$ is a decrypted block.

8. The non-transitory computer-readable storage medium of claim 6, wherein the encrypted data is encrypted based, at least in part, on a permutation that reorders elements given as input according to a page number.

9. The non-transitory computer-readable storage medium of claim 6, wherein decrypting the page further comprises:
for each page i:
a) computing $zeta_i$, $l_i$ from $delta_i$, wherein $delta_i$ is a predetermined variable;
b) computing $g(c_{ij})$ XOR $h(i)$ XOR $k`_i$ from $l_i$, wherein g and h are predetermined functions, $c_{ij}$ is an encrypted block, i is an index and $k_i`$ is a random key;
c) extracting $k_i`$;
d) computing $ZZeta_i = H(k_i`, i)$, wherein H is a predetermined function;
e) returning an error signal if $ZZeta_i$ not equal to $Zeta_i$;
f) computing $a_i$ with i and $k_i`$;
g) for each block element j inside the page i:
 i) computing $b_{ij}$ from $k_i$ and $c_{ij}$;
 ii) computing $m_{ij}$ from $b_{ij}$ and $a_i$;
returning $\{\{m_{ij}\}_j\}_i$ wherein $m_{ij}$ is a decrypted block of data.

10. The non-transitory computer-readable storage medium of claim 9, wherein $delta_i$ is obtained based on an inverse of $S(\ )$.

11. The non-transitory computer-readable storage medium of claim 9, wherein $S(\ )$ is a permutation that reorders elements given as input according to page number i.

12. The non-transitory computer-readable storage medium of claim 9, wherein $H(k_i`, i)$ is an HMAC function.

13. A non-transitory computer-readable storage medium having stored therein instructions which, when executed by a computing device, cause the computing device to perform steps comprising:
splitting message data into a plurality of pages, wherein each page of the plurality of pages further comprises a respective plurality of blocks;
deriving a page key, via a processor of a computing device, based on a set of keys, the plurality of blocks, an encryption algorithm, and a master key known to a receiving device;
encrypting each page of the plurality of pages with the page key to yield a plurality of encrypted pages; and
transmitting the plurality of encrypted pages to the receiving device.

14. The non-transitory computer-readable storage medium of claim 13, wherein the set of keys are randomly generated.

15. The non-transitory computer-readable storage medium of claim 13, wherein the page key is derived by, for each page i, performing steps comprising:
a) choosing a random variable $k_i'$;
b) computing $a_i = E_1(i, k_i')$, where $E_1$ is a first encryption algorithm and i is an index;
c) for each block element j inside the page i:
 1) computing $b_{ij} = m_{ij}$ XOR $a_i$ XOR $f(j)$, wherein $m_{ij}$ is a block of unencrypted data and f is a predetermined function;
 2) computing $c_{ij} = E_2(b_{ij}, k_i')$, wherein $E_2$ is a second encryption algorithm;
d) computing $g_i = (XOR_i\, g(c_{ij}))$ XOR $h(i)$ XOR $k_i'$, wherein g and h are predetermined functions and $(XOR_i\, g(c_{ij}))$ is the XOR of all the blocks c for the page i subject to the function g;
e) computing $l_i = E_3(g_i, k)$, wherein $E_3$ is a third encryption algorithm and k is the master key; and
f) returning $\{\{c_{ij}\}_j, l_i\}_i$ wherein $c_{ij}$ is an encrypted block.

16. The non-transitory computer-readable storage medium of claim 15, wherein $E_1$, $E_2$, and $E_3$ are a same encryption algorithm.

17. The non-transitory computer-readable storage medium of claim 15, wherein the encrypted pages are processed using a permutation that reorders elements given as input according to the page i.

18. The non-transitory computer-readable storage medium of claim 15, wherein $E_1$, $E_2$, and $E_3$ are a same encryption algorithm.

19. The non-transitory computer-readable storage medium of claim 13, wherein the encrypted pages are processed using an HMAC function.

20. A method comprising:
identifying a master key associated with a sending device;
splitting, via a processor of a computing device, encrypted data received from the sending device into a plurality of pages, wherein each page of the plurality of pages further comprises a respective plurality of blocks; and
decrypting each respective page of the plurality of pages using a corresponding page key generated based on a set of keys, the master key, the plurality of blocks and a decryption algorithm.

21. The method of claim 20, wherein decrypting each respective page of the plurality of pages further comprises, for each page i:
a) computing $zeta_i$, from $delta_i$, wherein $delta_i$ is a predetermined variable;
b) computing $g(c_{ij})$ XOR $h(i)$ XOR $k_i'$ from $l_i$, wherein g and h are predetermined functions, $c_{ij}$ is an encrypted block, i is the index and $k_i'$ is the random key;
c) extracting $k_i'$;
d) computing $ZZeta_i = H(k_i', i)$, wherein H is a predetermined function;
e) returning an error signal if $ZZeta_i$ not equal to $Zeta_i$;
f) computing $a_i$ with i and $k_i'$;
g) for each block element j inside the page i:
 i) computing $b_{ij}$ from $k_i$ and $c_{ij}$;
 ii) computing $m_{ij}$ from $b_{ij}$ and $a_i$;
h) returning $\{\{m_{ij}\}_j\}_i$ wherein $m_{ij}$ is a decrypted block of data.

22. The method of claim 21, wherein delta, is obtained based on an inverse function.

23. The method of claim 21, wherein the inverse function is a permutation function that reorders elements given as input according to page i.

24. The method of claim 21, wherein $H(k_i', i)$ is an HMAC function.

* * * * *